(12) United States Patent
Katagiri et al.

(10) Patent No.: US 6,455,096 B1
(45) Date of Patent: Sep. 24, 2002

(54) HARD CANDY WITH A RELATIVELY-HIGH MOISTURE AND HARDNESS, AND PROCESS OF THE SAME

(75) Inventors: Naohiko Katagiri; Satoshi Iritani; Toshio Miyake, all of Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 0 days.

(21) Appl. No.: 09/296,650

(22) Filed: Apr. 23, 1999

(30) Foreign Application Priority Data

Apr. 28, 1998 (JP) ............................. 10-134553
Jun. 5, 1998 (JP) ............................. 10-172085

(51) Int. Cl.$^7$ ................................. A23G 3/00
(52) U.S. Cl. ..................... 426/660; 426/72; 426/73; 426/74
(58) Field of Search ................ 426/660, 72, 73, 426/74

(56) References Cited

U.S. PATENT DOCUMENTS

| | | | | |
|---|---|---|---|---|
| 3,632,357 A | * | 1/1972 | Childs | |
| 4,158,064 A | * | 6/1979 | Banowitz | |
| 4,497,846 A | * | 2/1985 | Boursier et al. | |
| 4,518,581 A | * | 5/1985 | Miyake et al. | ................. 424/48 |
| 4,582,709 A | | 4/1986 | Peters et al. | |
| 4,692,339 A | | 9/1987 | Stetson et al. | |
| 4,738,854 A | * | 4/1988 | Friello et al. | |
| 4,753,816 A | * | 6/1988 | Vink et al. | |
| 4,820,544 A | * | 4/1989 | Barcelon et al. | |
| 4,883,685 A | * | 11/1989 | Kondou | |
| 5,073,389 A | * | 12/1991 | Wienecke | ................ 426/103 |
| 5,314,708 A | * | 5/1994 | Gonze | |
| 5,319,048 A | * | 6/1994 | Carosino et al. | ........... 527/300 |
| 5,399,354 A | * | 3/1995 | Ells et al. | |
| 5,538,883 A | * | 7/1996 | Nishimoto et al. | ......... 435/200 |
| 5,543,513 A | * | 8/1996 | Mandai et al. | ......... 536/123.13 |
| 5,554,410 A | * | 9/1996 | Bell et al. | |
| 5,576,303 A | * | 11/1996 | Shibuya et al. | ............... 514/53 |
| 5,578,469 A | * | 11/1996 | Shibuya et al. | |
| 5,637,344 A | * | 6/1997 | Carpenter et al. | |
| 5,656,308 A | | 8/1997 | Aga et al. | |
| 5,759,610 A | * | 6/1998 | Nishimoto et al. | |
| 5,892,026 A | * | 4/1999 | Okada et al. | |
| 5,912,007 A | * | 6/1999 | Pan et al. | |
| 5,916,881 A | * | 6/1999 | Okada et al. | |

FOREIGN PATENT DOCUMENTS

| | | |
|---|---|---|
| EP | 0 691 344 A1 | 1/1996 |
| EP | 0 739 986 A1 | 10/1996 |
| JP | 57-34788 | 7/1982 |
| JP | 58-50698 | 11/1983 |
| JP | 58-21695 | 12/1983 |
| JP | 05227889 A * | 7/1993 |
| JP | 7-170977 | 7/1995 |
| JP | 7-213283 | 8/1995 |
| JP | 7-246097 | 9/1995 |
| JP | 8-256694 | 10/1996 |
| JP | 408256694 A * | 10/1996 |
| JP | 8-336363 | 12/1996 |
| JP | 9-238642 | 9/1997 |
| WO | WO 91/07100 A1 | 5/1991 |
| WO | WO 96/03978 A1 | 2/1996 |
| WO | WO 97/28788 A1 | 8/1997 |
| WO | WO 99/08543 A1 | 2/1999 |

OTHER PUBLICATIONS

Patent Abstracts of Japan, "JP 09 056342 A, published Mar. 4, 1997 applicant: Nippon Shokuhin Kako Co Ltd".
Patent Abstracts of Japan, "JP 08 256694 A, published Oct. 8, 1996, applicant Nippon Shokuhin Kako Co Ltd.".
Patent Abstracts of Japan, "JP 10 210939 A, published Aug. 11, 1998, applicant Fuankeru KK".

* cited by examiner

*Primary Examiner*—Nina Bhat
(74) *Attorney, Agent, or Firm*—Browdy and Neimark

(57) ABSTRACT

A hard candy with a relatively-high moisture and hardness, and process of the same. The levels of moisture and hardness are respectively from about 3.5% to about 10%, and at least 4.0 kg as a penetration strength when measured by a rheometer. The hard candy is characteristic of a relatively-high transparency, insubstantial stickiness to the teeth, and lesser stimulation to the teeth.

18 Claims, No Drawings

HARD CANDY WITH A RELATIVELY-HIGH MOISTURE AND HARDNESS, AND PROCESS OF THE SAME

BACKGROUND OF THE INVENTION

1. Field of the Invention

The present invention relates to a hard candy with a relatively-high moisture and hardness, and more particularly to a hard candy enriched with trehalose and having a relatively-high moisture and hardness, and to a process of the same.

2. Description of the Prior Art

As disclosed in Japanese Patent Kokoku Nos. 34,788/82 and 50,698/83, hard candies are generally prepared by condensing aqueous saccharide solutions under heating conditions into those with a moisture content of two w/w % or lower (the wording "w/w %" is abbreviated as "%", unless specified otherwise), and in an usual manner cooling and shaping the concentrate. The aqueous saccharide solutions need a relatively-large amount of energy to be concentrated into such concentrates with a relatively-low moisture. The solutions have a relatively-high viscosity and need a relatively-high level handling. Thus, if the saccharide solutions should not necessarily be condensed to such a low-level of moisture, the energy consumption can be lowered, and the process of hard candies can be easily and simply improved.

However, it is generally said that when incompletely condensed as to show a relatively-high moisture content, particularly to a high-moisture content of over about 3.5%, hard candies may cause the following unfavorable problems: The hard candies become less hardened and become impossible of cooling and shaping, absorb moisture, change on shape, crystallize to show opaque, and cause adhesion and stickiness to the teeth.

Recently, trehalose or α,α-trehalose, a disaccharide as a food material, has become widely used. Trehalose has characteristic features of non-reducibility, satisfactory pH- and thermal-stabilities, mild and high-quality sweetness, relatively-low cariogenicity as a sweetener, and the use of an energy-source for living bodies. Therefore, it has been expected for establishing hard candies using such a useful trehalose characterized by the above satisfactory features. However, it has been known that trehalose has a serious demerit of easy crystallization when processed into hard candies. For example, Japanese Patent Kokai No. 256,694/96 discloses in the paragraph [0013] as follow: The percentage of trehalose in the material saccharides is preferably in the range of 0.5–60% by weight; it is not preferable at below the lower limit of 0.5% because the present effect will not be expected, and it is not preferable at over the upper limit of 60% because trehalose may crystallize during the processing of hard candies. In Example 1 of the above Japanese Patent Kokai, hard candies are produced by adjusting the trehalose content to 10% to the total material saccharides and using sugar and starch-based syrups as the resting 90% of starch hydrolysates. Japanese Patent Kokai No. 238,642/97 discloses in the paragraph [0015] as follow: It was found that the sole use of trehalose as a material for confectioneries such as candies is impossible due to the property of trehalose in terms of its way of crystallization. Example 1 of the Japanese Patent Kokai discloses a candy, prepared by providing 700 g maltitol with a purity of 95% and 300 g trehalose with a purity of 99.8%, adding water to the saccharides into a 70% composition for confectioneries, condensing the composition until heated to 180° C., and pouring the concentrate into a depositor to make a hard candy.

It was found that such a hard candy has the following defects: It is too low the proportion of trehalose to sufficiently exert the characteristic features of trehalose, and more particularly a hard candy, as disclosed in Japanese Patent Kokai No. 238,642/97, prepared by condensing an aqueous trehalose solution up to a high temperature of 180° C., is poor in the preservation stability under the above conditions and susceptible to crystallization of trehalose and to lack of transparency. Examples of candies, processed with a large amount of trehalose, are those disclosed in Examples B-10 and B-11 in Japanese Patent Kokai No. 336,363/96. These candies are, however, not hard ones but soft ones with a relatively-low hardness, fine trehalose crystals, and poor transparency.

SUMMARY OF THE INVENTION

The present invention relates to a novel hard candy which has a relatively-high moisture and hardness, as well as a satisfactory stability, and which does not need to be concentrated up to give a relatively-low moisture content; and more particularly relates to a hard candy enriched with trehalose and having the aforesaid advantageous features, a relatively-high moisture and hardness, and a satisfactory stability; and to a process of the same.

To overcome the above object, the present inventors continued studying on the use of saccharide solutions, and more particularly on the use of aqueous trehalose solutions. As a result, they unexpectedly found that a hard candy, enriched with trehalose and having a relatively-high moisture, hardness, and stability, is obtainable by concentrating under heating conditions an aqueous trehalose solution with a relatively-low trehalose concentration, which does not become saturated at around 70° C. with respect to trehalose, to make a moisture content from about 3.5% to about 10% as smooth as possible. Thus, the present inventors accomplished this invention.

To solve the above object, the present invention provides a hard candy with a relatively-high moisture, hardness, and stability by condensing aqueous trehalose solutions to give moisture contents from about 3.5% to about 10%, and preferably those from about 4% to less than 10%.

DETAILED DESCRIPTION OF THE INVENTION

The trehalose, alias a,a-trehalose, used in the present invention includes any types of trehaloses as long as they can be used for producing the present hard candy, independently of their origins and properties. Trehaloses from different origins, for example, one from yeasts obtained by extraction as disclosed in Japanese Patent Kokai No. 246,097/95, one from maltose by the method with phosphorylases as disclosed in Japanese Patent Kokai No. 216,695/83, and those from starches by the saccharification method with enzymes as disclosed in Japanese Patent Kokai Nos. 170,977/95 and 213,283/95 can be arbitrarily used.

Commercially available high-purity hydrous crystalline trehalose and high-purity anhydrous crystalline trehalose can be appropriately used. For example, "TREHAOSE®", a high-purity hydrous crystalline trehalose commercialized by Hayashibara Shoji, Inc., Okayama, Japan, can be also used arbitrarily.

Trehalose alone or in combination with other saccharides in an amount that does not spoil the properties of trehalose can be used as the saccharides in the present invention. Usually, the recommendable proportion of trehalose to the total sugars is over 60%, and preferably 65% or higher, on a dry solid basis (d.s.b.).

Examples of the saccharides suitably used in the present invention are one or more saccharides such as glucose, fructose, isomerized sugars, honey, maple syrup, maltose, isomaltose, sucrose, lactose, paratinose, neotrehalose, maltotriose, panose, raffinose, glucosyl trehalose, lactosucrose, isomaltooligosaccharides, soybean oligosaccharides, fructooligosaccharides, oligosaccharides with lactose and fructose, starch hydrolysates, and cyclodextrins; and sugar alcohols such as erythritol, xylitol, sorbitol, maltitol, lactitol, palatinate, and hydrogenated starch hydrolysates. The proportion of the saccharides to the total sugars can be chosen from those less than 40%, and preferably not higher than 35%, d.s.b., depending on use.

According to the present invention, saccharides, which could not have been used in conventional hard candies, such as fructose, isomerized sugars, honey, maple syrup, xylitol, and sorbitol can be used and easily processed into hard candies with a relatively-high moisture, hardness, and stability.

In the process for producing the present hard candy, the aqueous trehalose solutions preferably used in the present invention include those which have a relatively-low concentration of trehalose and do not reach to the saturation level at around 70° C., more preferably those with a trehalose concentration of less than 70%, and more preferably those with a trehalose concentration of about 60% or lower. These aqueous saccharide solutions can be generally concentrated to give a moisture content of 10% or lower, preferably those from about 3.5% to about 10%, more preferably those from about 4% or higher to less than about 10% for effectively eliciting the properties of trehalose, and more preferably those from about 5% or higher to less than about 10%. The methods for shaping the resulting concentrates include the systems of depositing, stumping and cutting, which are appropriately selected on demand.

The present hard candy, with a relatively-high moisture and hardness and enriched with trehalose, has a relatively-high thermal- and preservation-stabilities due to the property of trehalose per se, and has a relatively-lower temperature needed for condensation as to be enough for shortening the condensation time. The following substances with a poor thermal stability can be incorporated into the present hard candy without substantially deteriorating them into a highly-transparent hard candy: Taste-imparting agents such as highly-sweetened sweeteners including monosaccharides, amino acids/nucleic acid seasonings, and steviol glycosides/peptide sweeteners; natural pigments such as chlorophylls, carotenoids, proanthocyanidins, i.e. anthocyanins, and flavonoids; other natural pigments from flowers, vegetables, fruits, herbs, medicinal plants, microorganisms, and insects; natural flavors, vitamins, biological active substances, and medical ingredients. The hard candy thus obtained has a satisfactory shelf-life and is superior in properties in view of its taste preference, nutritional value, and health value.

Thus, one or more of adequate edible food materials such as nutritives, preferences, biological active substances, medical ingredients, and additives can be used and incorporated into the present hard candy as long as they do not spoil the property of the present hard candy. Solids such as fried fruits, seeds, crystallized saccharides, granules of vitamins, and other types of hard candies can be formulated by injecting into the present transparent hard candy to be seen through.

The nutritives appropriately used in the present invention include ingredients which are or may be defective in hard candies, energy-supplementing ingredients, and tonic ingredients; proteins, amino acids, lipids, vitamins, and minerals, as well as agricultural products such as vegetables, fruits, seeds, and processed products thereof; and products of fisheries and livestocks. The processed foods arbitrarily used in the present invention are, for example, the above agricultural products, fisheries, and livestocks being fragmented, pulverized, grounded, pressed, dried, and powdered; and others such as extracts, juices, purees, and concentrates of the above agricultural products. If necessary, seasoned and processed products such as pickles and dried foods can be arbitrarily used intact or those in a pulverized or powdered form after processed by heating or cooked by heating.

The agricultural products arbitrarily used in the present invention are as follow: Rootcrops such as a carrot, Indian lotus, onion, edible burdock, radish, taro, yam, sweet potato, and potato; vegetables such as a lettuce, wild chicory, cabbages including Chinese cabbage, kale, Jew's marrow, ashitaba (a plant of *Oenanthe javanica*), spinach, tsuyumurasaki (a kind of vegetable), komatsuna (a kind of Chinese cabbage), nozawana (a kind of turnip), garland chrysanthemum, chingensai (a Chinese vegetable), and turnip; vegetable fruits such as an okura, cauliflower, broccoli, egg plant, tomato, cucumber, pumpkin, zucchini, sweet pepper, field pea, garden bean, and green soybean; vegetables including sprouts such as an alfalfa, soybean sprout, and mung bean sprout; mushrooms such as a Japanese mushroom, velvet-stemmed agaric, and oyster mushroom; seaweeds such as a hijiki (a kind of brown algae), wakame seaweed, and tang; citrus fruits such as a lemon, yuzu (a Chinese lemon), sudachi (a kind of citrus fruit), zabon (shaddock), and kumquat; fruits such as a banana, pineapple, Chinese gooseberry, strawberry, hawthorn, blueberry, grape, peach, apple, pear, and Japanese chestnut; and seeds such as a Job's tear, buckwheat, sesame, rice, barley, wheat, corn, broad bean, soybean, peanut, walnut, pine nut, and other seeds and germs.

The preferences used in the present invention include a tea, green tea, coffee, cocoa, coca, herb, and medicinal plant; Examples of the herbs used in the present invention are a garlic, ginger, Japanese horseradish, mustard, parsley, Chinese parsley, green and red perilla (a beefsteak plant), Chinese chive, Welsh onion, celery, water dropwort, cresson, red pepper, Japanese pepper, pepper, rosemary, mint, mugwort, plantain, bad-smelling perennial plant of the family Saururaceae, *Cassia obtusifolia*, Japanese green gentian, aloe, licorice, turmeric, Japanese indigo plant, Pfaffia, loquat leaf, field horsetail, bamboo leaf, Japanese apricot, green tea, fresh leaf of burley, buckwheat leaf, ginkgo leaf, tochu-cha (a Chinese gutta percha leave), *oobanasarusuberi* (a plant of the family Lythrum), *Aspalathus linearis*, and *Gymnema sylvestre*. The biological active substances and medicinal ingredients used in the present invention include vitamins, hormones, saponins, antibiotics, antipyretic/sedative agents, fungicides, snapping turtle extracts, oyster meat extracts, ginseng extracts, nandin extracts, Chinese quince extracts, chlorella extracts, aloe extracts, propolis extracts, glycosyl hesperidin, and glycosyl rutin. Examples of the additives suitably used in the present invention are sweeteners, viscosity-imparting agents, stabilizers, antioxidants, acids, seasonings, emulsifiers, enhancers, colors, and flavors.

In spite of a relatively-high moisture content, the present hard candy thus obtained is one with a relatively-high product value because it has a relatively-high hardness and transparency, does not substantially stick to the teeth, has a saccharide part enriched with trehalose but free of coloration; stably encloses unstable substances per se such as natural pigments and flavors, vitamins, biologically active substances, and medical ingredients; has a satisfactory taste and flavor, and has an extremely-agreeable preservation-stability free of or substantially free of changing on the above properties. Unlike conventional hard candies made mainly of sugar and starch-based syrup, the present hard candy is a novel hard candy that does not stimulate the teeth of persons with hyperesthesia.

The present hard candy keeps a relatively-high hardness even when condensed at a relatively-high temperature; it is produced with a lesser energy consumption needed for the condensation, and it is easily handled even in a condensed form and effectively processed in a relatively-high productivity and yield.

The preferred embodiments according to the present invention are described below in detail:

Experiment 1

Comparison of Thermal Stability of Aqueous Saccharide Solutions

Crystalline glucose anhydride, crystalline maltose monohydrate, crystalline sucrose anhydride, crystalline maltitol anhydride, and crystalline trehalose dihydrate in a reagent grade were used as saccharides in this experiment. These saccharides were respectively mixed with 50 mM acetate buffer (pH 4.0) and 50 mM phosphate buffer (pH 7.0) to give a concentration of 70%, d.s.b., and dissolved by heating into aqueous saccharide solutions for testing. About 150 ml of each saccharide solution was placed in a 300-ml beaker, covered with aluminum foil, treated by heating with an autoclave at 120° C. for 30 min, cooled to 80° C., and examined for the color of the heated saccharide solutions. The degree of coloration of the heated saccharide solutions was expressed with the symbols "−", "+", "++", "+++", and "++++", representing colorless, pale yellow, yellow, yellow brown, and brown, respectively.

The results are in Table 1.

TABLE 1

| Test No. | Saccharide | Coloration (pH 4.0) | Coloration (pH 7.0) |
|---|---|---|---|
| 1 | Glucose | ++ | ++++ |
| 2 | Maltose | + | +++ |
| 3 | Sucrose | ++ | − |
| 4 | Maltitol | − | − |
| 5 | Trehalose | − | − |

Note:
In the table, the symbol "−" represents that a solution was still remained colorless, and the symbols "+", "++", "+++", and "++++" represent that the solutions turned to pale yellow, yellow, yellow brown, and brown, respectively.

As evident from Table 1, trehalose and maltitol as a sugar alcohol did not color at both pHs of 4.0 and 7.0, and showed a satisfactory thermal stability. It was found that glucose and maltose were relatively poor in thermal stability, and they were more susceptible to coloration at around neutral pHs, while sucrose was poor in thermal stability at acid pHs.

Experiment 2

Change by Heating on Aqueous High-concentrated Trehalose Solution

Crystalline trehalose dihydrate was placed in 300-ml beakers, and mixed with and dissolved by heating in water into pH-uncontrolled 50%, 60% and 70% aqueous trehalose solutions, d.s.b. The beakers were placed on an electric heater and heated while measuring the temperature of the solutions with "MODEL SK-1250MC", a digital thermometer commercialized by Sato Keiryoki Mfg., Co., Ltd., Tokyo, Japan. It was revealed that the solutions began to boiling at about 106° C., and when heated continuously, the solution with 70% trehalose as an initial concentration started to crystallize trehalose at about 115° C., and then lost its free-flowing ability and resulted in solidification. The aqueous trehalose solutions with 50% and 60% trehalose unexpectedly did not crystallize at about 115° C., and still retained their free-flowing ability even at a temperature of over 165° C., resulting in a novel finding that the aqueous trehalose solutions can be used intact as a concentrating solution for hard candies. Although the reason was uncertain, it can be estimated that a slight amount of trehalose crystal exists in the aqueous trehalose solutions by some reasons, and the crystal acts as a core seed for initiating the crystallization.

Experiment 3

Influence of the Types of Aqueous Saccharide Solutions and the Concentration Temperatures on Hard Candy Crystalline sucrose anhydride, crystalline maltitol anhydride, and crystalline trehalose dihydrate were used as saccharides.

Each saccharide was placed in a pan and mixed with water. The resulting mixtures were heated into 50% aqueous saccharide solutions, concentrated until heated to temperatures from 115° C. to 165° C., while the aqueous solutions were sampled and placed in a depositor at an interval of 10° C. increase of the solutions' temperature, and cooled to ambient temperature into candy samples with a size of 2 cm length, 1.5 cm wide, and 0.5 cm thick. Using the samples on the day of processed, they were measured for the levels of moisture, hardness, transparency, coloration, and stickiness to the teeth.

Fresh preparations of the same candy samples were placed in polyethylene bags with about 40μ thick, allowed to stand at about 25° C. for five days, and observed on transparency and stickiness to the teeth. The moisture content was measured in a usual manner by the method using diatomaceous earth. Using "FUDOH RHEO METER NRM-2010J-CW", a rheometer commercialized by Rheotech Co., Ltd., Tokyo, Japan; and a cylinder, about 3 mm in diameter, as an adaptor, the hardness was measured in a manner that a sample stage was elevated at a programmed rate of 2 cm/min to the cylinder, and measuring the intrusion strength (kg) when the cylinder inserted into the sample.

The coloration was evaluated by macroscopically observing the samples based on the same criterion as in Experiment 1. The transparency was studied by macroscopically observing the degree of transparency of the samples. The results of observation were graded into three ranks: High, low, and unobserved. The stickiness of samples to the teeth was examined based on the degree of stickiness to the teeth when bitten in the mouth, and the results were expressed by two grades of found, and not found.

The results are in Table 2.

TABLE 2

| Saccharide | Period (Day) | Items measured | Condensation temperature (° C., under normal atmospheric pressure) | | | | | |
|---|---|---|---|---|---|---|---|---|
| | | | 115 | 125 | 135 | 145 | 155 | 165 |
| Sucrose | 0 | Moisture (%) | 12.6 | 7.6 | 5.2 | 3.8 | 2.8 | 2.1 |
| | | Hardness (kg) | 0.1 | 0.8 | 3.7 | 4.2 | 4.2 | 4.2 |
| | | Transparency | High | High | High | High | High | High |
| | | Coloration | – | – | – | – | + | + + |
| | | Stickiness to the teeth | Yes | Yes | Non | Non | Non | Non |
| | 5 | Transparency | Non | Non | Non | Non | Low | High |
| | | Stickiness to the teeth | Non | Non | Non | Non | Non | Non |
| Maltitol | 0 | Moisture (%) | 12.4 | 7.1 | 4.9 | 3.6 | 2.7 | 2.1 |
| | | Hardness (kg) | 0 | 0.5 | 1.4 | 3.4 | 4.0 | 4.2 |
| | | Transparency | High | High | High | High | High | High |
| | | Coloration | – | – | – | – | – | – |
| | | Stickiness to the teeth | Yes | Yes | Yes | Yes | Yes | Non |
| | 5 | Transparency | High | High | High | High | High | High |
| | | Stickiness to the teeth | Yes | Yes | Yes | Yes | Yes | Yes |
| Trehalose | 0 | Moisture (%) | 15.3 | 9.9 | 7.1 | 5.2 | 3.6 | 2.4 |
| | | Hardness (kg) | 0.2 | 4.0 | 4.2 | 4.2 | 4.2 | 4.2 |
| | | Transparency | High | High | High | High | High | High |
| | | Coloration | – | – | – | – | – | – |
| | | Stickiness to the teeth | Yes | Non | Non | Non | Non | Non |
| | 5 | Transparency | Non | High | High | High | Low | Non |
| | | Stickiness to the teeth | Non | Non | Non | Non | Non | Non |

Note:
In the table, the symbol "–" represents that a solution was still remained colorless, and the symbols "+" and "+ +" represent that the solutions turned to pale yellow and yellow, respectively.

As evident from Table 2, it was found that, comparing with the aqueous solutions of sucrose and maltitol, the aqueous trehalose solutions keep a relatively-high moisture-retaining ability from 125° C. to about 165° C. under normal atmospheric pressure, and can be processed into hard candies with a relatively-high moisture, hardness, and transparency. It was also found that, unlike the hard candies processed with aqueous solutions of sucrose and maltitol, the hard candies processed with the aqueous trehalose solution retained a satisfactory stability with a lesser change on standing even when stored at ambient temperature. For the condensations with a reduced moisture content, obtained by condensing the aqueous trehalose solution at 155° C. or 165° C., the one at 155° C. slightly crystallized, and the other at 165° C. strongly crystallized and lost its transparency.

The above feature of trehalose was more exerted at lower temperatures in the range of from 125° C. to 155° C., and preferably in the range of from 125° C. to below 155° C., meaning that the hard candies processed by condensing at temperatures of from 125° C. to below 155° C. have a clearly higher moisture content of from about 3.5% to about 10% than those prepared with sucrose and maltitol, and preferably a moisture content of from about 4% to less than about 10%, and most preferably a moisture content of from about 5% to less than about 10%. These hard candies have a relatively-high hardness in spite of their relatively-high moisture, and have a satisfactory coloration, insubstantial stickiness to the teeth, lesser change on standing, and satisfactory stability.

Experiment 4

Influence of the Presence of Other Saccharides on Hard Candy Containing Trehalose Crystalline trehalose dihydrate was placed in a pan and mixed with water, and the mixture was heated into an about 50% aqueous trehalose solution. To the aqueous trehalose solution was added other saccharide of crystalline maltose monohydrate, crystalline sucrose anhydride, or crystalline maltitol anhydride to give a respective concentration of 30%, 60%, 65% or 80%, followed by dissolving the mixture by heating and adding a matcha (a powdered tea) in and to the resulting solution in an amount of 0.2% to the total contents. The solutions thus obtained were concentrated by boiling until heated to 145° C., and then poured into a depositor similarly as in Experiment 3, and cooled to ambient temperature to obtain a sample candy with the similar shape as the product in Experiment 3. Using the candy on the day processed, it was measured for hardness and examined on transparency, tint of matcha, and stickiness to the teeth according to the method in Experiment 3.

Similarly as in Experiment 3, fresh preparations of the same sample were placed in polyethylene bags, allowed to stand at 25° C. for five days for observing transparency and stickiness to the teeth. The results are in table 3.

TABLE 3

| Saccharide | Period (Day) | Items measured | Percentage (%) of trehalose to the total sugars, d.s.b. | | | |
|---|---|---|---|---|---|---|
| | | | 30 | 60 | 65 | 80 |
| Maltose | 0 | Moisture (%) | 4.0 | 4.4 | 4.9 | 5.1 |
| | | Hardness (kg) | 4.0 | 4.1 | 4.2 | 4.2 |
| | | Transparency | High | High | High | High |
| | | Tint of matcha | Dull | Slightly | Natural | Natural |

TABLE 3-continued

| Saccharide | Period (Day) | Items measured | \multicolumn{4}{c}{Percentage (%) of trehalose to the total sugars, d.s.b.} |
|---|---|---|---|---|---|---|
| | | | 30 | 60 | 65 | 80 |
| | | | color | dull color | color | color |
| | | Stickiness to the teeth | Non | Non | Non | Non |
| | 5 | Transparency | Low | High | High | High |
| | | Stickiness to the teeth | Non | Non | Non | Non |
| Sucrose | 0 | Moisture (%) | 4.3 | 4.7 | 5.0 | 5.1 |
| | | Hardness (kg) | 4.1 | 4.1 | 4.2 | 4.2 |
| | | Transparency | High | High | High | High |
| | | Tint of matcha | Dull color | Slightly dull color | Natural color | Natural color |
| | | Stickiness to the teeth | Yes | Non | Non | Non |
| | 5 | Transparency | Non | High | High | High |
| | | Stickiness to the teeth | Yes | Yes | Non | Non |
| Maltitol | 0 | Moisture (%) | 4.1 | 4.5 | 4.9 | 5.0 |
| | | Hardness (kg) | 3.2 | 3.8 | 4.0 | 4.2 |
| | | Transparency | High | High | High | High |
| | | Tint of matcha | Natural color | Natural color | Natural color | Natural color |
| | | Stickiness to the teeth | Yes | Yes | Non | Non |
| | 5 | Transparency | High | High | High | High |
| | | Stickiness to the teeth | Yes | Yes | Non | Non |

As evident from the results in Table 3, it was found that the hard candies with a trehalose content of over 60% to the total sugars, d.s.b., particularly, the hard candies with a trehalose content of at least 65%, d.s.b., well exert the properties of the hard candies of trehalose, prepared using a relatively-low concentration temperature of 145° C.; the hard candies have a relatively-high hardness and transparency, substantially do not have a stickiness to the teeth, well retain the vivid tint of matcha per se, have a satisfactory matcha taste, exert features suitable for hard candies such as a high shelf-life, and have a high product-value. It was also found that the hard candy with a lower trehalose content of 30% may not be expected for a sufficient hardness, tends to lose the tint of matcha per se, causes stickiness to the teeth, and has other defect of being susceptible to change on standing.

The following examples describe the present invention in detail:

EXAMPLE 1

Fifty parts by weight of water was added to 85 parts by weight of "TREHAOSE®", a high-purity hydrous crystalline trehalose commercialized by Hayashibara Shoji, Inc., Okayama, Japan, and 15 parts by weight of xylitol, followed by dissolving by heating the saccharides in water. The solution was concentrated until heated to 150° C. Just before completely condensed, the concentrate was mixed with 0.1 part by weight of a peppermint extract.

The concentrate thus obtained was shaped using a depositor to obtain a hard candy with a moisture content of about 5.0% and an about 4 kg hardness. According to the present invention, even a xylitol, which is hard to be processed into hard candies, was easily prepared into one with a relatively-high moisture and hardness.

The product is a satisfactory hard candy which has a relatively-high transparency, does not substantially stick to the teeth, less stimulates the teeth, has an agreeable fresh and peppermint taste, and less changes on standing.

EXAMPLE 2

Sixty-five parts by weight of crystalline trehalose hydrate and 25 parts by weight of "SUNMALT®S", a high-purity hydrous crystalline maltose commercialized by Hayashibara Shoji, Inc., Okayama, Japan, were mixed with 37 parts by weight of water. The saccharides were dissolved in water by heating and concentrated until the solution was heated to 140° C. Just before completion of the concentration, the resulting concentrate was mixed with 0.1 part by weight of citric acid and 0.2 part by weight of a powdered red-perilla (a beefsteak plant).

According to the method in Example 1, the concentrate thus obtained was shaped in a usual manner into a hard candy with a moisture content of about 6.2% and a hardness of about 4.2 kg.

The product is a satisfactory hard candy which has a relatively-high transparency, does not substantially stick to the teeth, does not substantially stimulate the teeth, has a vivid tint of red perilla, and a satisfactory flavor and taste, and less changes on standing.

The product can be arbitrarily used as a hard candy that relives allergic patients' symptoms such as atopy and pollenosis.

EXAMPLE 3

Eighty parts by weight of "TREHAOSE®", a high-purity hydrous crystalline trehalose commercialized by Hayashibara Shoji, Inc., Okayama, Japan, and 20 parts by weight of a 7-time condensed red grape juice were mixed with 45 parts by weight of water, followed by dissolving the saccharides in water. The solution was concentrated at about 120° C. under a reduced pressure to give a moisture content of about 7.8%. According to the method in Example 1, the concentrate was shaped in a usual manner to obtain a hard candy with a moisture content of about 7.8% and hardness of about 4 kg.

The product is a satisfactory hard candy which has a relatively-high transparency, does not substantially stick to the teeth, less stimulates the teeth, has a satisfactory vivid tint, flavor and taste of red grapes, and less changes on standing.

The product contains a quantity of polyphenols of red grapes, and can be arbitrarily used as a health food for keeping and promoting health and preventing aging.

EXAMPLE 4

Sixty parts by weight of "TREHAOSE®", a high-purity hydrous crystalline trehalose commercialized by Hayashibara Shoji, Inc., Okayama, Japan were added to 40 parts by weight of water and dissolved by heating. The pH of the solution was adjusted to a pH of about 6.5 by the addition of 0.2 part by weight of sodium citrate, followed by condensing the solution under normal atmospheric pressure until heated to 130° C. Just before completion of the concentration, the resulting concentrate was mixed with one part by weight of "PROPHYLLA®", a powdery propolis pulverized by using anhydrous maltose powder, commercialized by Hayashibara Shoji, Inc., Okayama, Japan.

The concentrate thus obtained was shaped using a stamper into a hard candy with a moisture content of about 8.8% and a hardness of about 4.2 kg.

The product is a satisfactory hard candy which has a relatively-high transparency, does not substantially stick to the teeth, less stimulates the teeth, has a satisfactory vivid tint, flavor, and taste of flavonoids in propolis, and less changes on standing.

The product can be advantageously used as a candy of caring for the throat by utilizing the antiseptic activity of propolis.

EXAMPLE 5

Eighty parts by weight of "TREHAOSE®", a high-purity hydrous crystalline trehalose, and 20 parts by weight of "MABIT®", anhydrous crystalline maltitol, both of which are commercialized by Hayashibara Shoji, Inc., Okayama, Japan, were mixed with and dissolved by heating in 55 parts by weight of water. The solution was concentrated under normal atmospheric pressure until heated to 135° C. Just before completion of the concentration, the resulting concentrate was mixed with one part by weight of L-ascorbic acid and one part by weight of a lemon powder, and according to the method in Example 1, the mixture was shaped in a usual manner into a hard candy with a moisture content of about 7.1% and a hardness of about 4.0 kg.

The product is a satisfactory hard candy which has a relatively-high transparency; does not substantially stick to the teeth; less stimulates the teeth; has a satisfactory vivid tint, flavor, and taste of lemon; and less changes on standing.

The product can be advantageously used as a source of vitamin C.

EXAMPLE 6

Ninety-five parts by weight of "TREHAOSE®", a high-purity hydrous crystalline trehalose commercialized by Hayashibara Shoji, Inc., Okayama, Japan, and 5 parts by weight of sorbitol were mixed with and dissolved by heating in 50 parts by weight of water. The solution was concentrated under normal atmospheric pressure until heated to 145° C. Just before completion of the concentration, the resulting concentrate was mixed with 0.2 part by weight of citric acid, 0.2 part by weight of glycosyl hesperidin, and two parts by weight of a dried carrot. The concentrate was shaped in a cutting manner into a hard candy with a moisture content of about 5.3% and a hardness of about 4.2 kg.

The product is a satisfactory hard candy which has a relatively-high transparency, does not substantially stick to the teeth, less stimulates the teeth, has a satisfactory vivid tint, flavor, and taste of carrot, and less changes on standing.

The product contain a quantity of glycosyl hesperidin and carotenoids present in carrot and can be arbitrarily used as a heath food for maintaning/promoting health and prevent ageing.

EXAMPLE 7

Eighty parts by weight of "TREHAOSE®", a high-purity hydrous crystalline trehalose commercialized by Hayashibara Shoji, Inc., Okayama, Japan, and 40 parts by weight of tomato juice were mixed with and dissolved by heating in 20 parts by weight of water. The solution was concentrated under a reduced pressure until heated to 125° C., and according to Example 1 the concentrate was shaped to obtain a hard candy with a moisture content of about 6.5% and a hardness of about 4.2 kg.

The product is a satisfactory hard candy which has a relatively-high transparency, does not substantially stick to the teeth, less stimulates the teeth, has a satisfactory vivid tint, flavor, and taste of tomato, and less changes on standing.

The product contains a quantity of lycopene present in tomato and can be arbitrarily used as a heath food for maintaining/promoting health and preventing ageing.

EXAMPLE 8

Eighty-five parts by weight of "TREHAOSE®", a high-purity hydrous crystalline trehalose commercialized by Hayashibara Shoji, Inc., Okayama, Japan, was mixed with and dissolved by heating in 40 parts by weight of water. The solution was mixed with 15 parts by weight of honey and concentrated under normal atmospheric pressure until heated to 140° C., and according to Example 4 the concentrate was shaped into a hard candy with a moisture content of about 5.8% and a hardness of about 4.2 kg.

The product is a satisfactory hard candy which has a relatively-high transparency; does not substantially stick to the teeth; less stimulates the teeth; has a satisfactory vivid tint, flavor, and taste of honey; and less changes on standing.

As described above, the present hard candy is a novel hard candy that has a relatively-high hardness in spite of a relatively-high moisture and transparency, does not substantially stick to the teeth, and does not stimulate the teeth of persons with hyperesthesia. The hard candy has the following advantageous properties: It contains a quantity of stable trehalose which does not cause coloration and browning, retains stably the coexisting natural pigments, flavors, vitamins, biological active substances, medicinal ingredients which are all unstable in themselves, has a satisfactory flavor and taste, and does not substantially or very scarcely change these properties during storage. The present hard candy has a relatively-high hardness even when processed at a relatively-low concentration temperature; the energy needed for concentration can be effectively reduced, and the resulting concentrate is easily handled and effectively processed in a relatively-high productivity and yield.

Thus, the present invention has established a novel hard candy and explored a novel health food and an orally-administrable medicament, and will contribute to energy-saving and improve the productivity and yield thereof. The influence of the present invention is widespread, and the present invention will greatly contribute and give an unfathomable contribution to the fields of confectioneries, sweeteners, health foods, and orally-administrable medicaments.

While there has been described what is at present considered to be the preferred embodiments of the invention, it will be understood the various modifications may be made therein, and it is intended to cover the appended claims all such modifications as fall within the true spirits and scope of the invention.

We claim:

1. A hard candy comprising trehalose and optionally another saccharide, and
   which has a moisture content in the range of about 3.5 w/w % to about 10 w/w %,
   wherein the content of said trehalose to the total sugars is over 60 w/w %, on a dry solid basis,
   said hard candy prepared by boiling an aqueous trehalose solution having a trehalose concentration of less than 70%, at a temperature of at least 125° C. but not higher than 155° C. to produce said hard candy having a moisture content in the range of about 3.5 w/w % to about 10 w/w %.

2. The hard candy according to claim 1, which has a hardness of at least 4.0 kg as a penetration strength when measured by a rheometer.

3. The hard candy according to claim 1, wherein said trehalose is α,α-trehalose.

4. The hard candy according to claim 1, wherein said another saccharide is one or more members selected from the group consisting of glucose, fructose, isomerized sugars, honey, maple syrup, maltose, isomaltose, sucrose, lactose, paratinose, neotrehalose, maltotriose, panose, raffinose, glucosyl trehalose, lactosucrose, isomaltooligosaccharides, soybean oligosaccharides, fructooligosaccharides, oligosaccharides with lactose and fructose, starch hydrolysates, and cyclodextrins; and sugar alcohols including erythritol, xylitol, sorbitol, maltitol, lactitol, palatinate, and hydrogenated starch hydrolysates.

5. The hard candy according to claim 1, wherein the content of said saccharide is less than 40 w/w % of the total sugars, on a dry solid basis.

6. The hard candy according to claim 1, which contains one or more edible food materials selected from the group consisting of nutritives, teas, green teas, coffees, cocoas, cocas, herbs, medicinal plants, biological active substances, medicinal ingredients, and additives.

7. The hard candy according to claim 1, which is transparent and/or stabilized.

8. The hard candy according to claim 1, which does not substantially stick to and/or stimulate the teeth.

9. A process for producing a hard candy with a moisture content in the range of about 3.5 w/w % to about 10 w/w %, which comprises
   boiling an aqueous trehalose solution to give a moisture content of from about 3.5 w/w % to about 10 w/w %.

10. The process according to claim 9, wherein said aqueous trehalose solution is a member selected from the group consisting of aqueous solutions containing only trehalose as a saccharide, and aqueous saccharide solutions comprising trehalose and other saccharide other than trehalose, said trehalose being used in an amount of over 60 w/w % to the total sugars, on a dry solid basis, when used together with said other saccharide.

11. The process according to claim 10, wherein said other saccharide is one or more members selected from the group consisting of glucose, fructose, isomerized sugars, honey, maple syrup, maltose, isomaltose, sucrose, lactose, paratinose, neotrehalose, maltotriose, panose, raffinose, glucosyl trehalose, lactosucrose, isomaltooligosaccharides, soybean oligosaccharides, fructooligosaccharides, oligosaccharides with lactose and fructose, starch hydrolysates, and cyclodextrins; and sugar alcohols including erythritol, xylitol, sorbitol, maltitol, lactitol, palatinate, and hydrogenated starch hydrolysates.

12. The process according to claim 9, wherein said aqueous trehalose solution has a trehalose concentration of less than 70 w/w %.

13. The process according to claim 9, wherein said aqueous trehalose solution is one prepared by boiling an aqueous trehalose solution containing less than 70 w/w % trehalose.

14. The process according to claim 9, wherein said hard candy has a hardness of at least 4.0 kg as a penetration strength when measured by a rheometer.

15. The process according to claim 9, wherein said trehalose is α,α-trehalose.

16. The process according to claim 9, which comprises a step of incorporating into said aqueous trehalose solution one or more edible materials selected from the group consisting of nutritives, teas, green teas, coffees, cocoas, cocas, herbs, medicinal plants, biological active substances, medicinal ingredients, and additives.

17. In a method for making hard candy comprising providing an aqueous solution of at least one sugar and condensing said solution to reduce the water content, the improvement comprising:
   boiling an aqueous trehalose solution having a trehalose concentration of less than 70%, at a temperature of at least 125° C. but not higher than 155° C. to condense into a hard candy having a moisture content in the range of about 3.5 w/w % to about 10 w/w %, whereby the moisture content of said hard candy is increased while maintaining hardness of said hard candy, wherein said aqueous solution contains said trehalose in an amount of over 60% to the total sugars and optionally contains another saccharide in an amount of less than 40%, on a dry solid basis.

18. The method according to claim 17, wherein the level of hardness of said hard candy is at least 4.0 kg as a penetration strength when measured by a rheometer.

* * * * *